UNITED STATES PATENT OFFICE.

MAX GIRARD, OF BASEL, SWITZERLAND, ASSIGNOR TO SOCIETY OF CHEMICAL INDUSTRY IN BASLE, OF BASEL, SWITZERLAND.

PROCESS FOR THE MANUFACTURE OF THE ASSIMILABLE ORGANIC PHOSPHORUS COMPOUND CONTAINED IN VEGETABLE FOODSTUFFS.

1,290,971.   Specification of Letters Patent.   Patented Jan. 14, 1919.

No Drawing.   Application filed July 7, 1917.  Serial No. 179,259.

*To all whom it may concern:*

Be it known that I, Dr. MAX GIRARD, chemist, a citizen of the Swiss Republic, and resident of Basel, Switzerland, have invented a new and useful Process for the Manufacture of the Assimilable Organic Phosphorus Compound Contained in Vegetable Foodstuffs, of which the following is a full, clear, and exact specification.

It has not been possible hitherto, for instance by the processes described in the United States Letters Patents No. 754,803 and 886,852 to extract in pure condition and with commercial yield the assimilable organic phosphorus compound contained in most of the vegetable foodstuffs, such as seeds or oil-cakes obtained by Posternak and usually considered to be a salt or a mixture of salts of an anhydro-oxymethylene-diphosphoric acid or a derivative from formaldehyde and having the assumed formula $C_2H_8P_2O_9$. Preparations which have been obtainable by the said processes have not been free of odor and taste due to the presence of certain organic substances which either could not be separated or were produced in the course of the purification process from organic admixtures in the parent materials. Thus in separating organic admixtures by treatment with chlorin, chlorinated albumen compounds are formed, which can not be completely separated and therefore are always contained in the final product, imparting to this a disagreeable odor and taste. Furthermore, the phosphorus contained in the products does not correspond in proportion with that demanded by theory, which is due to the contents of calcium and magnesium chlorids that can not be completely separated by the known processes. It is the presence of these salts that causes the objectionable hygroscopic property of the final product.

When it is attempted to purify the products obtained by the known processes, the operation is accompanied by such losses of the active material that the yield becomes commercially useless.

By the present invention this organic phosphorus compound can be manufactured in a pure condition, quite free from taste and odor, and with commercial yield, by treating the aqueous solution of the dibasic alkaline earth metal salt obtained by decomposing the insoluble tetrabasic alkaline earth metal salt of the organic phosphorus compound by means of a suitable acid, with an adsorbent which takes up only the organic admixtures without adsorbing the active substance. The most important of such adsorbents is animal charcoal, but for this may be substituted wholly or in part other suitable adsorbents, such as silicic acid. From the filtered solution thus purified the alkaline earth metal not combined with the organic phosphorus compound, may be separated by precipitation by means of an equivalent quantity of oxalic acid, and from the solution, again filtered, the dibasic salt of the organic phosphorus compound may be precipitated by means of alcohol. The product thus obtained is pure and forms a snow-white microcrystalline powder, quite free from odor and taste and containing 22.4 per cent. of phosphorus, which corresponds with that required by theory.

The following example illustrates the invention:

Example 1: 450 kilos of a paste of 30 per cent. strength of the tetrabasic insoluble calcium salt of the organic phosphorus compound are dissolved in 60 kilos of pure hydrochloric acid of 30 per cent. strength for the purpose of its conversion into the dibasic soluble calcium salt. The brown and somewhat strongly smelling solution is mixed with ½ kilo of animal charcoal and the mixture is well stirred for about one hour; it is then filtered and the calcium which is not present in combination with the phosphorus compound is precipitated by adding to the filtrate an aqueous solution of 15–18 kilos of oxalic acid. The calcium oxalate is filtered out and the dibasic salt of the organic phosphorus compound precipitated by adding to the filtrate 1200 liters of alcohol of 95 per cent. strength, and is filtered out, washed and dried. It is obtained thus in the form of a dazzling white, quite tasteless powder.

Example 2: 450 kilos of a paste of 30% strength of the tetrabasic salt are transformed into the dibasic salt, as described in Example 1. The resulting solution is mixed with about 2½ kilos of silicious marl and the mixture thoroughly stirred, until on setting of the adsorbent, the solution is perfectly clear; it is then filtered and further purified as described in Example 1.

What I claim is:

The herein described process for the manufacture in pure form of the assimilable organic oxymethylene phosphorus compound contained in most of the vegetable foodstuffs substantially as described, by decomposing, by means of an acid, the tetrabasic alkaline earth metal salt of the organic phosphorus compound, treating the aqueous solution of the dibasic alkaline earth metal salt thus obtained with an absorbent, which can take up only the organic admixtures without adsorbing the active substance, then filtering and separating from the filtered solution thus purified the alkaline earth metal, not combined with the organic phosphorus compound, by means of an equivalent quantity of oxalic acid, filtering and precipitating from the filtrate the dibasic salt of the organic phosphorus compound by means of alcohol.

In witness whereof I have hereunto signed my name this 12th day of June, 1917, in the presence of two subscribing witnesses.

Dr. MAX GIRARD.

Witnesses:
 CARL O. SPAMER,
 AMAND RITTER.